US007992256B2

(12) United States Patent
Shen

(10) Patent No.: US 7,992,256 B2
(45) Date of Patent: Aug. 9, 2011

(54) HINGE WITH ASEISMATIC FUNCTION

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 415 days.

(21) Appl. No.: 12/331,402

(22) Filed: Dec. 9, 2008

(65) Prior Publication Data

US 2010/0095484 A1 Apr. 22, 2010

(30) Foreign Application Priority Data

Oct. 17, 2008 (CN) ...................... 2008 2 0302459 U

(51) Int. Cl.
*E05D 3/10* (2006.01)

(52) U.S. Cl. ................. 16/367; 16/340; 16/334; 16/386

(58) Field of Classification Search .................. 016/367, 016/386, 338–340, 330, 303, 380, 342; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS 1,554,787 A * 9/1925 Chason ........................... 362/90
2,815,201 A * 12/1957 Girod-Eymery .............. 267/203
3,157,056 A * 11/1964 Gray et al. .................... 474/239
4,954,936 A * 9/1990 Kawabata et al. ....... 362/249.01
5,276,945 A * 1/1994 Matsumura ..................... 16/337
5,598,607 A * 2/1997 Katagiri .......................... 16/337
5,706,700 A * 1/1998 Takagi et al. .................. 74/7 C
6,052,869 A * 4/2000 Suzuki ............................ 16/341
7,346,960 B2 * 3/2008 Higano et al. .................. 16/367
7,450,172 B2 * 11/2008 Lee et al. ...................... 348/373
2005/0108854 A1 * 5/2005 Lee et al. ........................ 16/340
2007/0033771 A1 * 2/2007 Hung ............................. 16/367
2008/0078060 A1 * 4/2008 Chen .............................. 16/367

* cited by examiner

*Primary Examiner* — Chuck Y. Mah
(74) *Attorney, Agent, or Firm* — Zhigang Ma

(57) ABSTRACT

A hinge includes a positioning member, and a first rotational assembly rotatably mounted to the positioning member. The first rotational assembly comprises a first shaft rotatably mounted to the positioning member, an interference member, a resilient member fixed to the first shaft, and a securing member fixed to the first shaft. The interference member is fixed to the first shaft, and slide relative to the positioning member to engage with or disengage from the positioning member. The resilient member comprises an aseismatic block and a spring clamping a circumference of the aseismatic block. The resilient member is sandwiched between the interference member and the securing member, and the interference member abuts against the aseismatic block.

14 Claims, 4 Drawing Sheets

HINGE WITH ASEISMATIC FUNCTION

BACKGROUND

1. Technical Field

The present disclosure relates to hinges and, particularly, to a hinge capable of reducing impact shock when used.

2. Description of Related Art

A collapsible device, such as a notebook computer, or a clamshell mobile phone, generally including a main body and a display, often uses a hinge to interconnect the main body and the display. The hinge allows the display to be rotational with respect to the main body, and to be folded to the main body for saving space.

A hinge normally includes a male interference member and a female interference member fixed to the main body and the display of the collapsible device, respectively. The male interference member includes at least one raised portion. The female interference member includes at least one depressed portion configured for receiving the at least one raised portion. When the male and the female interference members are rotated relative to each other, the at least one raised portion is in frictional engagement with the at least one depressed portion. Therefore, the display can be maintained at any angle with respect to the main body by friction between the male and female interference members. However, impact shock may easily occur when the at least one raised portion engages with the at least one depressed portion, between the display and the main body, possibly resulting in damage the collapsible device.

DETAILED DESCRIPTION

Figure 1:
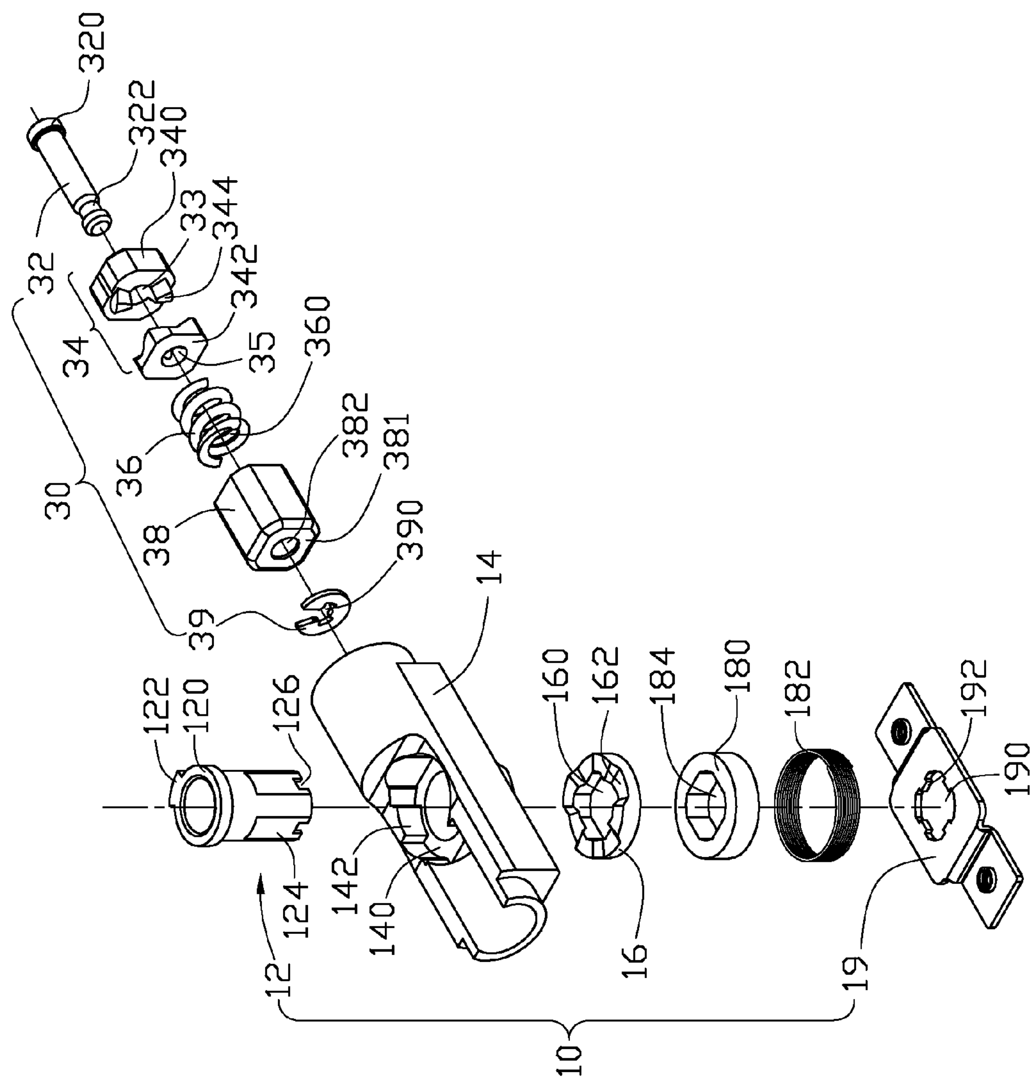
FIG. 1 is an exploded, isometric view of an exemplary embodiment of a hinge including a resilient member.
Figure 2:
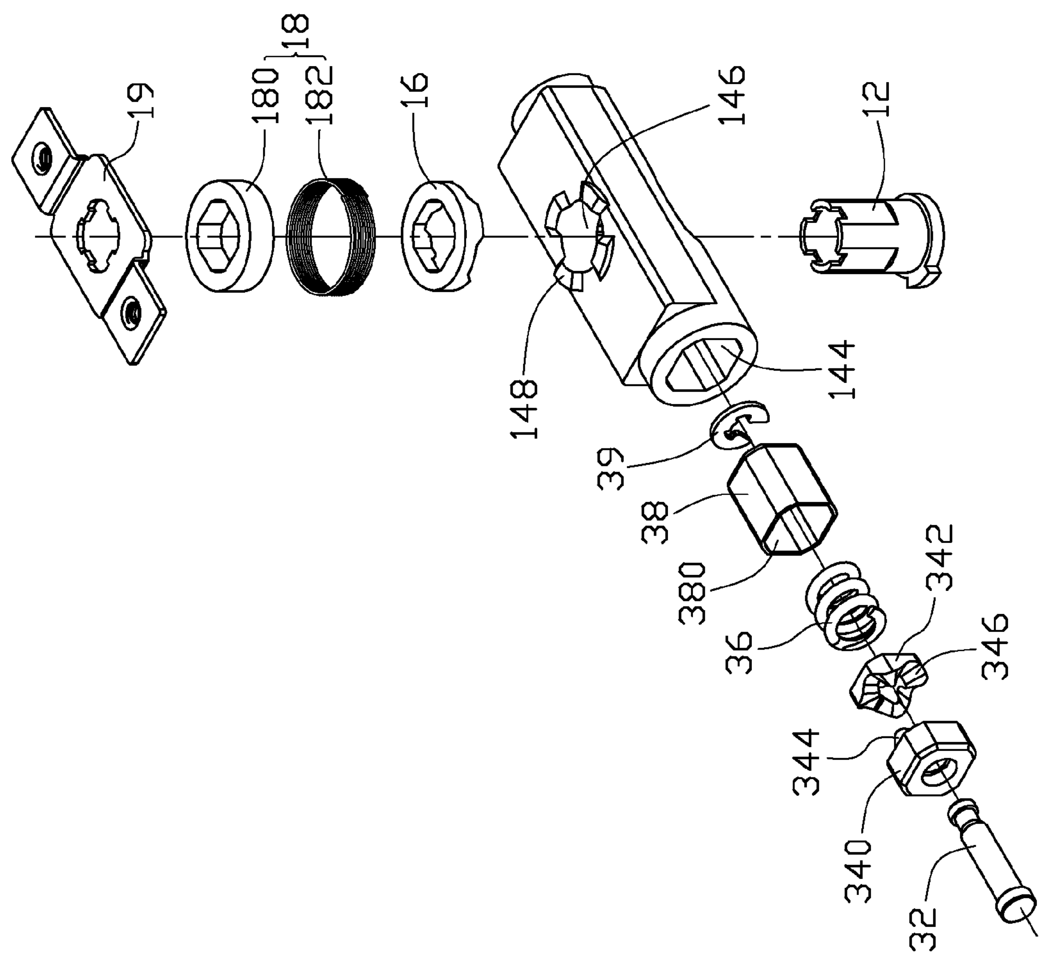
FIG. 2 is similar to FIG. 1, but viewed from another perspective.

Referring to FIGS. 1 and 2, an exemplary embodiment of a hinge includes a positioning member 14, a first rotational assembly 10 rotatably mounted to the positioning member 14 about a generally vertical first rotation axis, and a second rotational assembly 30 rotatably mounted to the positioning member 14 about a generally horizontal second rotation axis that is generally perpendicular to the first rotation axis. The first and second rotational assemblies 10, 30 able to rotate without interfering with each other.

The positioning member 14 includes a first side and a flat second side opposite to the first side. The first side defines a circular receiving space 140. A protruding portion 142 extends into the receiving space 140 from a sidewall of the receiving space 140. A bottom of the receiving space 140 defines a through hole 146 through the second side of the positioning member 14. The positioning member 14 further axially defines a fixing hole 144 perpendicular to the through hole 146. A plurality of raised portions 148 protrudes out from the second side of the positioning member 14, arranged around the through hole 146.

The first rotational assembly 10 includes a hollow cylindrical first shaft 12 rotatably received in the through hole 146 of the positioning member 14, an interference member 16 engaged with the positioning member 14, a resilient member 18, and a securing member 19.

The first shaft 12 is generally T shaped. A tab 120 radially extends from a circumference of a fist end of the first shaft 12, and a stop block 122 radially extends from the tab 120. A circumference of a second end of the first shaft 12 includes a plurality of plane portions to form a clamping portion 124. A clamping cutout 126 is defined in each plane portion.

The interference member 16 is cylindrical, and axially defines a through shaft hole 160. The shape of a cross-section of the shaft hole 160 corresponds to a cross-section of the clamping portion 124, resulting in the clamping portion 124 being in engagement with the shaft hole 160. Therefore, the interference member 16 is non-rotatably fixed to the first shaft 12. A side of the interference member 16 facing the positioning member 14 defines a plurality of recessed portions 162 around the shaft hole 160 to engage with the raised portions 148.

Figure 3:
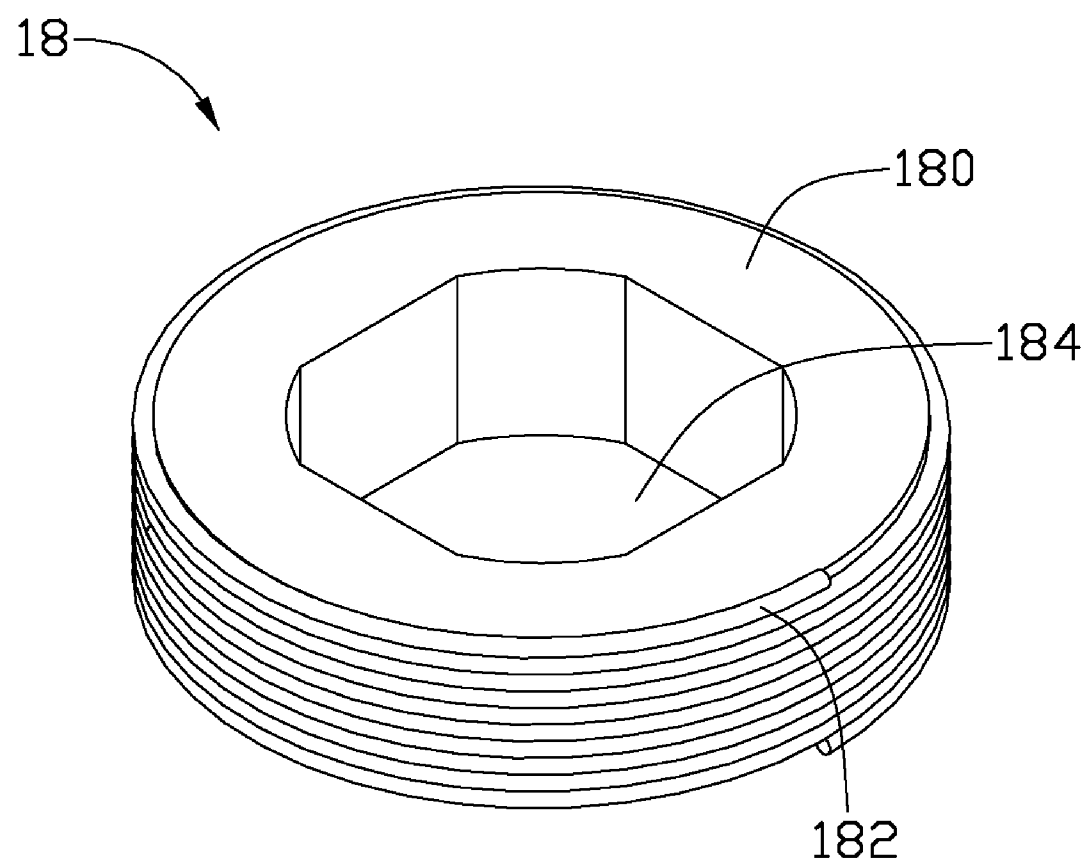
FIG. 3 is an enlarged, isometric view of the resilient member of the hinge of FIG. 1.

Referring to FIG. 3, the resilient member 18 includes a cylindrical elastic aseismatic block 180, and a spring 182 fitting about the aseismatic block 180. The aseismatic block 180 defines a fixing hole 184 shaped corresponding to a cross-section of the clamping portion 124. Therefore, the first shaft 12 can be immovably fixed to the aseismatic block 180. The spring 182 firmly clamps around a circumference of the aseismatic block 180 resulting in restricting distortion of the aseismatic block 180 along a radial direction. In other embodiments, the aseismatic block 180 can be made of rubber.

The securing member 19 defines a fixing hole 190 for engaging with the clamping portion 124. A plurality of fixing posts 192 extends into the fixing hole 190 from a sidewall bounding the fixing hole 190, for engaging in the corresponding clamping cutouts 126. Therefore, the securing member 19 can be immovably fixed to and rotated together with the first shaft 12.

The second rotational assembly 30 includes a second shaft 32, an interference assembly 34, an elastic member 36, a sleeve 38, and a fixing member 39.

The second shaft 32 includes a head 320 located at a first end of the second shaft 32, and defines an annular slot 322 in a circumference of a second end opposite to the head 320.

The interference assembly 34 includes a first element 340 and a second element 342 engaged with the first element 340. The first element 340 defines a stepped hole 33 in a center for the second shaft 32 passing through, therefore allowing the first element 340 rotationally relative to the second shaft 32. The stepped hole 33 includes a small hole adjacent to the second element 342, and a big hole opposite to the second element 342 and communicating with the small hole. Two protrusions 344 protrude from a side facing the second element 342 of the first element 340, opposite to each other across the stepped hole 33. The second element 342 defines a through hole 35 in a center for the second shaft 32 passing through. A plurality of depressed portions 346 is defined in a first side of the second element 342 facing the first element 340. Every two opposite depressed portions 346 can engage with the corresponding protrusions 344.

The elastic member 36 defines a through hole 360 for the second shaft 32 passing through. The elastic member 36 is a coil spring in the instant embodiment. In other embodiments, the elastic member 36 may be a plurality of stacked elastic washers.

The sleeve 38 has a generally rectangular cross-section, corresponding to the fixing hole 144 of the positioning member 14. The sleeve 38 includes a closed end 381, and longitudinally defines a receiving hole 380 through one end opposite to the closed end 381. The closed end 381 defines a through hole 382 communicating with the receiving hole 380. A cross-section of the receiving hole 380 corresponds to a cross-section of the second element 342. Therefore, the second element 342 can be slidably mounted to the receiving hole 380.

The fixing member 39 is generally C-shaped in the instant embodiment, and defines a fixing hole 390 in a center thereof.

Figure 4:
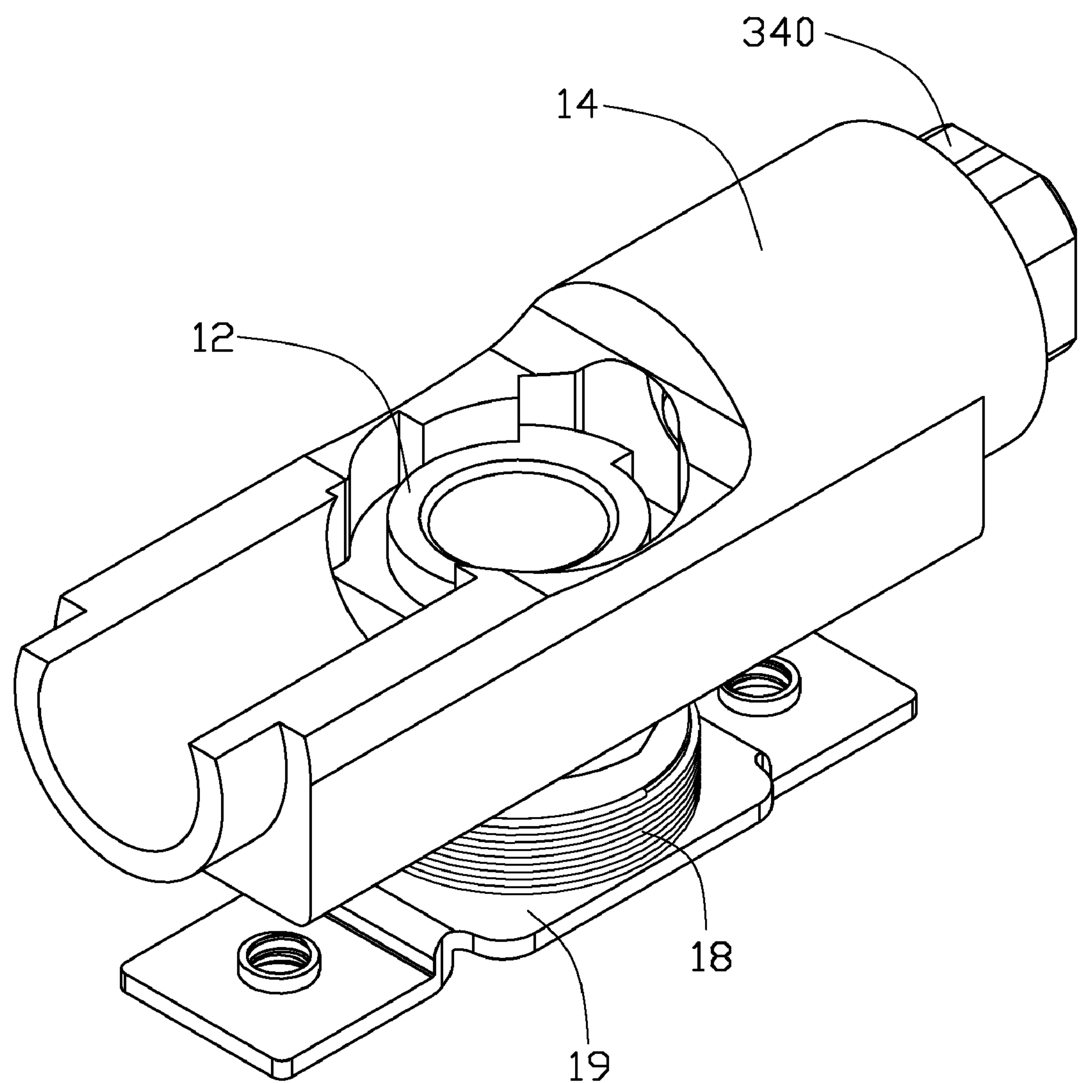
FIG. 4 is an assembled, isometric view of the hinge of FIG. 1.

Referring to FIG. 4, in assembly, the first shaft 12 is passed through the through hole 146 of the positioning member 14, the shaft hole 160 of the interference member 16, the fixing hole 184 of the resilient member 18 in turn, and then, the first shaft is inserted into and fixed to the fixing hole 190 of the securing member 19 via the clamping portion 124. The fixing posts 192 are engaged in the corresponding clamping cutouts 126. As a result, the first shaft 12 is fixed to and rotated with the securing member 19.

In the aforementioned assembly, the tab 120 is received in the receiving space 140, and supported by the bottom of the receiving space 140. The first shaft 12 is rotatably passed through the through hole 146. The interference member 16 and the resilient member 18 are immovably mounted to the clamping portion 124. Therefore, the interference member 16 and the resilient member 18 are rotated together with the first shaft 12 and the securing member 19. The interference member 16 is mounted between the positioning member 14 and the resilient member 18, with the recessed portions 162 engaged with the corresponding raised portions 148. As a result, the interference member 16 firmly resists against the aseismatic block 180 to distort the aseismatic block 180.

The second shaft 32 is passed through the stepped hole 33 of the first element 340, the through hole 35 of the second element 342, the through hole 360 of the elastic member 36, the receiving hole 380 and the through hole 382 of the sleeve 38 in turn, and then, the second shaft 32 is engaged with the fixing hole 390 via the slot 322. Therefore, the fixing member 39 resists against an outer surface of the closed end 381, to prevent the first element 340, the second element 342, the elastic member 36, and the sleeve 38 from disengaging from the second shaft 32. In the assembly, the first and second elements 340, 342 are rotatable relative to the second shaft 32, with the protrusions 344 engaged with the corresponding depressed portions 346. The second element 342 and the elastic member 36 are received in the receiving hole 380. As a result, two ends of the elastic member 36 respectively resist against the second element 342 and an inner surface of the closed end 381. The head 320 of the second shaft 32 is received in the greater hole of the stepped hole 33. The sleeve 38 is fixed to the fixing hole 144 of the positioning member 14. Therefore, the second rotational assembly 30 is fixed to the positioning member 14.

In use, during the rotation of the first rotational assembly 10, the securing member 19 is rotated with the resilient member 18, the interference member 16, and the first shaft 12 respect to the positioning member 14. Therefore, the interference member 16 is rotated relative to the positioning member 14, with the raised portions 148 engaged with or disengaged from the corresponding recessed portions 162. In this movement, when the raised portions 148 are disengaged from the recessed portions 162, the interference member 16 moves away from the positioning member 14 to distort the aseismatic block 180. When the raised portions 148 are slid into the recessed portions 162, the aseismatic block 180 restores to absorb a bumping force between the positioning member 14 and the interference member 16. Moreover, the spring 182 clamps against the aseismatic block 180, resulting in insuring enough distortion along the axial direction of the aseismatic block 180. The first rotational assembly 10 cannot be rotated further when the stop block 122 resists against the protruding portion 142.

The second rotational assembly 30 can also be rotated. During the rotation of the second rotational assembly 30, the first element 340 may be rotated relative to the second element 342. As a result, the protrusions 344 of the first element 340 can be engaged with or disengaged from the corresponding depressed portions 346. When the protrusions 344 are disengaged from the depressed portions 346, the second element 342 moves away from the first element 340 to distort the elastic member 36. When the protrusions 344 are engaged with the corresponding depressed portions 346, the elastic member 36 restores to reduce a bumping force between the first and second elements 340 and 342, and drives the second element 342 to resist against the first element 340. Obviously, the second rotational assembly 30 can further includes an aseismatic block 180 positioned in the elastic member 36, resulting in improving absorption the bumping force between the first and second elements 340 and 342.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A hinge comprising:

a positioning member;

a first rotational assembly rotatably mounted to the positioning member and comprising:

a first shaft rotatably mounted to the positioning member;

an interference member fixed to the first shaft, and slidable relative to the positioning member to engage with or disengage from the positioning member;

a securing member fixed to the first shaft; and a resilient member fixed to the first shaft and sandwiched between the interference member and the securing member, wherein the resilient member comprises an aseismatic block and a spring clamping a circumference of the aseismatic block, the interference member abuts against the aseismatic block.

2. The hinge of claim 1, wherein the aseismatic block is made of rubber, the spring is a coil spring to restrict distortion of the aseismatic block along a radial direction.

3. The hinge of claim 1, wherein a plurality of raised portions protrudes out from the positioning member; the interference member defines a plurality of recessed portions engagable with the plurality of raised portions.

4. The hinge of claim 1, wherein the positioning member defines a receiving space, a protruding portion extends into the receiving space from a sidewall of the receiving space, a stop block extends from the first shaft, the stop block is capable of resisting against the protruding portion, to limit the first shaft's rotating range.

5. The hinge of claim 4, wherein the first shaft comprises a tab radially extending from a circumference of the first shaft, the stop block radially extends from the tab, the tab with the stop block is received in the receiving space, and supported by a bottom of the receiving space.

6. The hinge of claim 4, wherein the positioning member defines a through hole through a bottom of the receiving space, the first shaft is rotatably passed through the through hole.

7. The hinge of claim 1, wherein the first shaft comprises a clamping portion, the interference member, the securing member, and the resilient member are fixed to the clamping portion.

8. The hinge of claim 7, wherein the clamping portion defines a plurality of cutouts, the securing member defines a fixing hole for engaging with the clamping portion, a plurality of fixing posts protrudes from a sidewall bounding the fixing hole for engaging with the corresponding cutouts.

9. The hinge of claim 1, further comprising a second rotational assembly rotatably mounted to the positioning member, wherein the second rotational assembly comprises a sleeve fixed to the positioning member, a second shaft passing through the sleeve, and an elastic member and an interference assembly both mounted to the second shaft.

10. The hinge of claim 9, wherein the second rotational assembly further comprises a fixing member defining a fixing hole, the second shaft defines a slot in a circumference thereof, the fixing member clamps the second shaft via the slot engaging with the fixing hole.

11. The hinge of claim 9, wherein the positioning member comprises a fixing hole for receiving the sleeve, the sleeve comprises a closed end at a first end thereof and transversely defines a receiving hole through a second end thereof, and a through hole is defined in the closed end communicating with the receiving hole, the second shaft is passed through the receiving hole and the through hole.

12. The hinge of claim 11, wherein the interference assembly comprises a first element received in the sleeve and a second element slidably and rotatably engaged with the first element, at least one depressed portion is defined in the first element, the second element comprises at least one protrusion engagable with the at least one depressed portion.

13. The hinge of claim 12, wherein the elastic member is received in the receiving hole, and positioned between the closed end and the first element, two ends of the elastic member resist against the closed end and the first element.

14. The hinge of claim 11, wherein the second element defines a stepped hole for the second shaft passing through, the second shaft comprises a head received the stepped hole.

* * * * *